(12) United States Patent
Xu et al.

(10) Patent No.: US 12,481,270 B2
(45) Date of Patent: Nov. 25, 2025

(54) HART CIRCUIT AND METHOD FOR DETERMINING THE STATE OF A FIELD INTERFACE THEREOF

(71) Applicant: SHANGHAI CHENZHU INSTRUMENT CO., LTD., Shanghai (CN)

(72) Inventors: Min Xu, Shanghai (CN); Gang Du, Shanghai (CN); Jianjun Chen, Shanghai (CN); Chunhui Zhang, Shanghai (CN)

(73) Assignee: SHANGHAI CHENZHU INSTRUMENT CO., LTD., Shanghai (CN)

( * ) Notice: Subject to any disclaimer, the term of this patent is extended or adjusted under 35 U.S.C. 154(b) by 0 days.

(21) Appl. No.: 18/276,132

(22) PCT Filed: Jun. 17, 2022

(86) PCT No.: PCT/CN2022/099323
§ 371 (c)(1),
(2) Date: Aug. 7, 2023

(87) PCT Pub. No.: WO2023/216362
PCT Pub. Date: Nov. 16, 2023

(65) Prior Publication Data
US 2025/0004453 A1  Jan. 2, 2025

(30) Foreign Application Priority Data
May 11, 2022  (CN) .......................... 202210511096.2

(51) Int. Cl.
*G05B 19/418* (2006.01)
*H02M 1/00* (2007.01)
(Continued)

(52) U.S. Cl.
CPC ...... *G05B 19/4186* (2013.01); *H02M 1/0009* (2021.05); *H02M 1/0012* (2021.05);
(Continued)

(58) Field of Classification Search
CPC .. G05B 19/4186; H02M 1/0009; H02M 3/003
See application file for complete search history.

(56) References Cited

U.S. PATENT DOCUMENTS

| 6,006,338 A | 12/1999 | Longsdorf et al. |
| 2004/0184517 A1 | 9/2004 | Westfield et al. |
| (Continued) | | |

FOREIGN PATENT DOCUMENTS

| CN | 102288849 A | 12/2011 |
| CN | 202404431 U | 8/2012 |
| (Continued) | | |

OTHER PUBLICATIONS

International Search Report for PCT Application No. PCT/CN2022/099323, dated Jun. 17, 2022, 9 pages.
(Continued)

*Primary Examiner* — Mark A Connolly
(74) *Attorney, Agent, or Firm* — Dickinson Wright PLLC (57) ABSTRACT

The present application discloses a HART circuit and a method for determining the state of the field interface thereof. The HART circuit includes a control interface, an adjustable power supply module, a first HART module, an isolation module, and a field interface. The first HART module is configured to generate a first control signal when receiving a first inquiry signal from the control interface. The adjustable power supply module is configured to output a first power signal to the control interface and, in response to the first control signal, modulate the first power signal into a first HART signal. The isolation module is configured to isolate a signal from the first terminal of the isolation module and couple the isolated signal to a second terminal of the isolation module. The field interface is connected to the second terminal of the isolation module.

12 Claims, 4 Drawing Sheets

(51) Int. Cl.
H02M 3/00 (2006.01)
H02M 3/335 (2006.01)

(52) U.S. Cl.
CPC .......... H02M 3/003 (2021.05); H02M 3/335 (2013.01); *G05B 2219/24015* (2013.01)

(56) References Cited

U.S. PATENT DOCUMENTS

| | | | | |
|---|---|---|---|---|
| 2006/0273776 A1* | 12/2006 | Smart | ............... | G05B 19/0423 |
| | | | | 323/304 |
| 2009/0303090 A1* | 12/2009 | Korn | ............... | G08C 19/02 |
| | | | | 341/110 |
| 2011/0172790 A1* | 7/2011 | Alley | ............... | G05B 19/0423 |
| | | | | 700/17 |
| 2015/0160281 A1 | 6/2015 | Zaki et al. | | |

FOREIGN PATENT DOCUMENTS

| | | |
|---|---|---|
| CN | 112776606 A | 5/2021 |
| CN | 113839903 A | 12/2021 |
| CN | 114142730 A | 3/2022 |
| JP | 2010530211 A | 9/2010 |
| JP | 2012208697 A | 10/2012 |
| JP | 2016517511 A | 6/2016 |
| JP | 2021518613 A | 8/2021 |

OTHER PUBLICATIONS

European Search Report for Application No. 22902458.3, dated Sep. 11, 2024, 6 pages.
First Office Action with English Translation for Japanese Application No. 2023-540857, Sep. 24, 2024, 8 pages.

* cited by examiner

HART CIRCUIT AND METHOD FOR DETERMINING THE STATE OF A FIELD INTERFACE THEREOF

CROSS-REFERENCE TO RELATED APPLICATIONS

This is a National Stage Application, filed under 35 U.S.C. 371 based on International Patent Application number PCT/CN2022/099323, filed Jun. 17, 2022, which claims priority to Chinese Patent Application No. 202210511096.2 filed May 11, 2022, the disclosures of which are incorporated herein by reference in their entireties.

TECHNICAL FIELD

Embodiments of the present application relate to measurement and control technology, for example, a HART circuit and a method for determining the state of a field interface thereof.

BACKGROUND

As automation increases, so does the number of sensors used in industrial fields. In high-risk production fields such as fields in petroleum, chemical and natural gas, many sensors and positioning valves need to be communicatively connected to the control system.

Since a production field is far away from a control room where the control system is located, and the sensors and positioning valves are distributed scatteredly, conventional communication connection apparatuses mostly use 4-20 mA analog current signals to transmit signals to achieve communication between the field and the control room.

For the conventional communication connection apparatuses, only a single control or detection function can be achieved, remote bidirectional interaction is not possible, and problems of single functions and poor performance exist.

SUMMARY

The present application provides a Highway Addressable Remote Transducer (HART) circuit and a method for determining the state of a field interface thereof to achieve bidirectional communication between a control room and a production field.

In a first aspect, embodiments of the present application provide a HART circuit. The HART circuit includes a control interface, an adjustable power supply module, a first HART module, an isolation module, and a field interface.

The first HART module is connected to the control interface. The first HART module is configured to generate a first control signal when receiving a first inquiry signal inputted from the control interface 101.

The adjustable power supply module is connected to the control interface and the first HART module. The adjustable power supply module is configured to output a first power signal to the control interface and, in response to the first control signal, modulate the first power signal into a first HART signal.

A first terminal of the isolation module is connected to the control interface. The isolation module is configured to isolate a signal from the first terminal of the isolation module and couple the isolated signal to a second terminal of the isolation module.

The field interface is connected to the second terminal of the isolation module.

In a second aspect, embodiments of the present application also provide a method for determining the state of a field interface of the HART circuit as described in the first aspect. The method for determining the state of the field interface of the HART circuit includes the steps described below.

A resistance measuring apparatus is connected between the two interfaces of the control interface.

A resistance value between the two interfaces of the control interface is measured by the resistance measuring apparatus.

Whether a disconnection fault occurs in the field interface is determined according to the relative relationship between the resistance value between the two interfaces of the control interface and a preset resistance value.

DETAILED DESCRIPTION

The technical solutions in embodiments of the present application are described clearly and completely hereinafter in conjunction with drawings in the embodiments of the present application.

It is to be noted that terms "first", "second", and the like in the description, claims, and drawings of the present application are used to distinguish between similar objects and are not necessarily used to describe a particular order or sequence. It should be understood that the data used in this manner are interchangeable where appropriate so that the embodiments of the present application described herein may also be implemented in a sequence not illustrated or described herein. In addition, terms "comprising", "including", and any other variations thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

Figure 1:
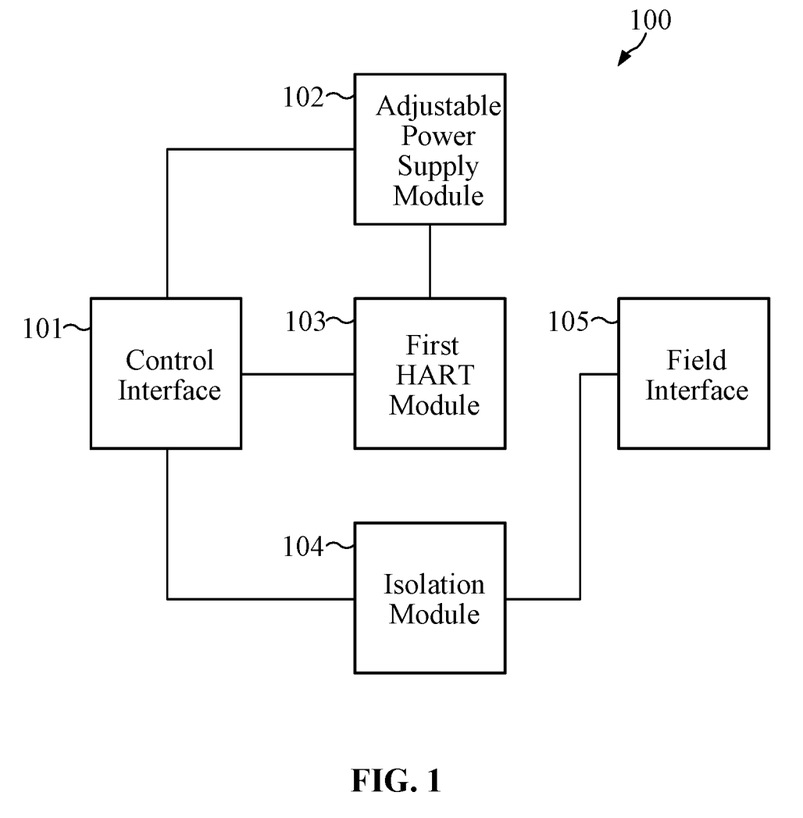
FIG. 1 is a diagram illustrating the structure of a HART circuit according to an embodiment of the present application.

This embodiment of the present application provides a HART circuit. FIG. 1 is a diagram illustrating the structure of a HART circuit according to this embodiment of the present application. Referring to FIG. 1, the HART circuit 100 includes a control interface 101, an adjustable power supply module 102, a first HART module 103, an isolation module 104, and a field interface 105. The first HART module 103 is connected to the control interface 101. The first HART module 103 is configured to generate a first control signal when receiving a first inquiry signal inputted from the control interface 101. The adjustable power supply module 102 is connected to the control interface 101 and the first HART module 103. The adjustable power supply module 102 is configured to output a first power signal to the control interface 101 and, in response to the first control signal, modulate the first power signal into a first HART signal. A first terminal of the isolation module 104 is connected to the control interface 101. The isolation module 104 is configured to isolate a signal from the first terminal of the isolation module and couple the isolated signal to a second terminal of the isolation module 104. The field interface 105 is connected to the second terminal of the isolation module 104.

The control interface 101, an interface disposed on the control room side, may be connected to a transmitter monitoring apparatus, a positioning valve monitoring apparatus, or a diagnostic apparatus. The field interface 105, an interface disposed on the production field side, may be connected to a transmitter or a positioning valve. The adjustable power supply module 102, an internal power supply module of the HART circuit 100, can provide a variable power supply. The first HART module 103 is a communication module for achieving HART communication between the control interface 101 and the field interface 105. When the field interface 105 has an analog signal input, the first HART module 103 can achieve HART communication between the control interface 101 and the field interface 105. The first inquiry signal refers to a communication signal input by a diagnostic apparatus to the control interface 101 for inquiring about the operating state of the transmitter.

For example, the first inquiry signal includes first inquiry information. The first inquiry information is inquiry information sent by the control room to the transmitter connected to the field interface 105. The transmitter may input corresponding reply information to the field interface 105 according to the first inquiry information. The adjustable power supply module 102 can provide a first power signal and can also modulate the first power signal into a first HART signal according to the first control signal from the first HART module 103. The first HART signal is generated according to the first control signal from the first HART module 103. The first HART signal also includes the first inquiry information. The isolation module 104 can implement isolation and coupling function between the first terminal and the second terminal of the isolation module 104. The isolation function can isolate the field interface 105 from the adjustable power supply module 102 and the control interface 101, thereby ensuring that apparatuses connected to the field interface 105 are not affected by the adjustable power supply and the control interface 101. Moreover, mutual transmission of signals at two terminals of the isolation module 104 is achieved. Illustratively, the isolation module 104 may be a combined module of a coupling circuit, a transformer apparatus, and a rectifier circuit.

Illustratively, on the one hand, in the case where the field interface 105 is connected to a transmitter, to acquire measurement data of the transmitter, the control interface 101 may be connected to a transmitter monitoring apparatus on the control room side. The transmitter monitoring apparatus includes a load resistance connected to the control interface 101 and can determine measurement data of the transmitter by detection of an electrical signal on the load resistance. When the field interface 105 is connected to the transmitter, the adjustable power supply module 102 in the HART circuit 100 outputs a first power signal. For example, the first power signal may be a direct current voltage. The first power signal is transmitted to the first terminal of the isolation module 104 via the load resistance. The second terminal of the isolation module 104 is connected to the field interface 105. The transmitter can adjust the resistance connected to the field interface 105 according to the measurement data. The resistance connected to the field interface 105 affects the variation of the electrical signal at the second terminal of the isolation module 104, which is thus coupled to the first terminal of the isolation module 104. Then, the transmitter monitoring apparatus connected to the control interface 101 can determine the measurement data of the transmitter by detecting the electrical signal on the load resistance. For example, the resistance of the transmitter connected to the field interface 105 affects the variation of the 4-20 mA analog current signals between the second terminal of the isolation module 104 and the field interface 105, which is thus coupled to the first terminal of the isolation module 104. Then the transmitter monitoring apparatus connected to the control interface 101 can determine the measurement data of the transmitter by detecting the 4-20 mA analog currents flowing through the load resistance.

In addition, when the transmitter transmits the measurement data to the control interface 101 via the HART circuit 100, if it is found that the measurement data is abnormal at the control room side and a need exists to query the transmitter state or other data at the field side, a diagnostic apparatus can be connected to the control interface 101. For example, the diagnostic apparatus may be a HART communicator. The diagnostic apparatus can input a first inquiry signal to the control interface 101. The parameters of the first inquiry signal can be adjusted in real time by the diagnostic apparatus. The first HART module 103 is connected to the control interface 101 and can generate a first control signal according to the first inquiry signal. The adjustable power supply module 102 modulates the first power signal into a first HART signal according to the first control signal generated by the first HART module 103 and outputs the first HART signal to the first terminal of the isolation module 104. The second terminal of the isolation module 104 is connected to the field interface 105. The transmitter connected to the field interface 105 can determine the corresponding inquiry information according to the first HART signal output by the field interface 105. The transmitter connected to the field interface 105 can respond to the first HART signal and input a second reply signal to the field interface 105. The diagnostic apparatus can acquire the transmitter state or other related data according to the second reply signal output by the control interface 101. Illustratively, the first HART signal and the second reply signal may be ±0.5 mA current signals.

On the other hand, in the case where the field interface 105 is connected to a positioning valve, to control the specific parameters of the positioning valve, the control interface 101 is connected to a positioning valve monitoring apparatus on the control room side. The positioning valve monitoring apparatus is disposed between two interfaces of the control interface 101 and is connected to a variable power supply. For example, the variable power supply may be a direct current source. The variable power supply can input an opening control signal corresponding to the control parameter to the control interface 101. When the field interface 105 is connected to a positioning valve, the adjustable power supply module 102 in the HART circuit 100 outputs the first power signal. The current signal obtained by superimposing the first power signal and the opening control signal can be used as the positioning valve control signal. The positioning valve control signal is transmitted to the first terminal of the isolation module 104. The second terminal of the isolation module 104 is connected to the field interface 105. The positioning valve can adjust specific parameters according to the positioning valve control signal output by the field interface 105. Signal transmission in this process achieves control of the field positioning valve at the control room side. For example, the positioning valve monitoring apparatus may deliver a variable current signal to the control interface 101. The first power signal may be a voltage signal and can guarantee the transmission capability of the variable current signal. The variable current signal may be a 4-20 mA analog current signal, which is transmitted to the field interface 105 via the isolation module 104. The positioning valve connected to the field interface 105 can adjust specific parameters according to the 4-20 mA analog current signal. For example, the specific parameters may be parameters such as opening of the positioning valve, closing of the positioning valve, and/or opening amount of the positioning valve.

The HART circuit provided by this embodiment is configured to include a control interface, an adjustable power supply module, a first HART module, an isolation module, and a field interface. The adjustable power supply module can provide variable power supply for the HART circuit to form a loop. The isolation module forms isolation and coupling between the control interface and the field interface, which can not only prevents the influence of the equipment connected to the control interface and the power supply on the safety of the field equipment, but also achieves the transmission of analog signals between the control interface and the field interface, thereby achieving the detection or control of the equipment connected to the field interface by the equipment connected to the control interface. The first HART module can generate the first control signal according to the first inquiry signal input by the control interface. The adjustable power supply module can modulate the first power signal into a first HART signal according to the first control signal. In the case where the equipment connected to the control interface detects the equipment connected to the field interface, the first HART module achieves HART communication between the control interface and the field interface. The HART signal is superimposed on the analog signal in the circuit, so that achieving a bidirectional communication between a control room and a production field on the basis of the transmission of the analog signal. Moreover, the application scenarios of the communication function of the HART circuit are more diversified, and the performance of the HART circuit is improved.

Figure 2:
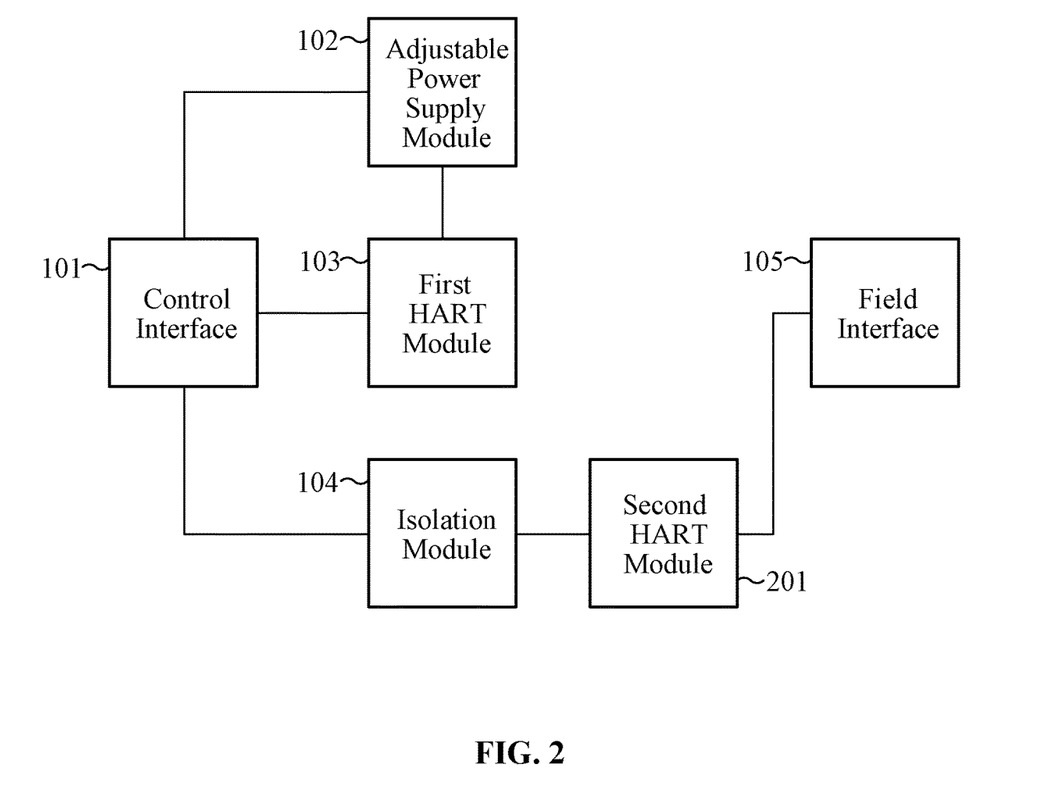
FIG. 2 is a diagram illustrating the structure of another HART circuit according to an embodiment of the present application.

For example, FIG. 2 is a diagram illustrating the structure of another HART circuit according to this embodiment of the present application. Referring to FIG. 2, based on the preceding embodiment, the HART circuit 100 also includes a second HART module 201 disposed between the field interface 105 and the second terminal of the isolation module 104. The second HART module 201 is configured to modulate the first reply signal into a second HART signal and transmit the second HART signal to the second terminal of the isolation module 104 when receiving the first reply signal inputted from the field interface 105.

The second HART module 201 is a module for achieving HART communication between the control interface 101 and the field interface 105. When the control interface 101 has an analog signal input, the second HART module 201 can achieve HART communication between the control interface 101 and the field interface 105.

For example, the second HART module 201 can modulate the first reply signal input by the field interface 105 into a second HART signal and transmit the second HART signal to the second terminal of the isolation module 104. The isolation module 104 can couple the second HART signal from the second terminal to the first terminal of the isolation module 104 and transmit the second HART signal to the control interface 101. The diagnostic apparatus connected to the control interface 101 can determine feedback information of the positioning valve connected to the field terminal according to the second HART signal. For example, the first reply signal may include an alternating current voltage signal. Parameters such as a voltage level and frequency of the alternating current voltage signal are related to real-time parameters of the positioning valve. The real-time parameters may include state parameters such as switch state and opening.

Illustratively, while the positioning valve monitoring apparatus controls the positioning valve connected to the field interface 105 via the HART circuit 100, if the control room needs to determine a specific operation parameter of the field positioning valve to determine whether the operation parameter of the positioning valve satisfies a preset condition, a diagnostic apparatus can be connected to the control interface 101. For example, the diagnostic apparatus may be a HART communicator. The diagnostic apparatus may include an alternating current source. The second inquiry signal may be an alternating current signal. The alternating current source can input a second inquiry signal to the control interface 101. The parameters of the second inquiry signal can be adjusted in real time by the diagnostic apparatus. The second inquiry signal can be coupled and transmitted by the isolation module 104, to the field interface 105 for transmission to the positioning valve. Upon receiving the second inquiry signal, the positioning valve may reply to the corresponding first reply signal in response to the inquiry information in the second inquiry signal. The second HART module 201 can modulate the first reply signal into a second HART signal and transmit the second HART signal to the second terminal of the isolation module 104. The isolation module 104, due to the coupling function, can transmit the second HART signal from the second terminal to the first terminal of the isolation module 104. In turn, the second HART signal can be output via the control interface 101. Illustratively, the second inquiry signal and the second HART signal may be ±0.5 mA current signals.

The HART circuit provided by this embodiment is provided with a second HART module. When receiving a first reply signal from the field interface, the second HART module can module the first reply signal into a second HART signal and transmit the second HART signal to the control interface by the coupling and isolation of the isolation module. In this manner, HART communication in multiple scenarios is achieved. HART communication can be applied to both the control circuit of a positioning valve and the monitoring circuit of a transmitter so that bidirectional HART communication is achieved on the basis transmission of analog current signals, thereby improving applicability of the HART circuit.

Figure 3:
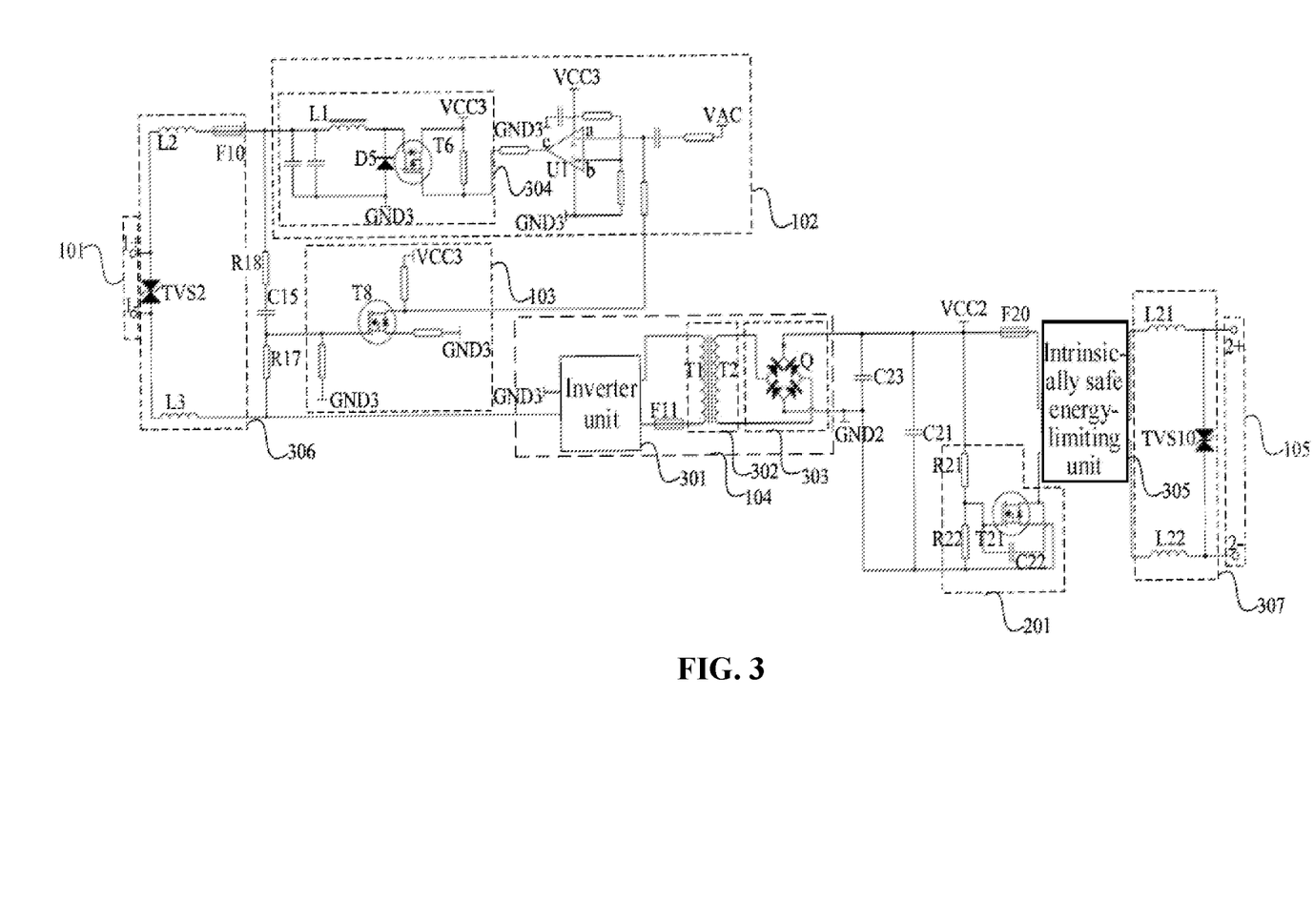
FIG. 3 is a diagram illustrating the structure of another HART circuit according to an embodiment of the present application.

For example, FIG. 3 is a diagram illustrating the structure of another HART circuit according to this embodiment of the present application. Referring to FIG. 3, based on the preceding embodiments, the second HART module 201 includes a first switch transistor T21, a first resistance R21, a second resistance R22, and a first capacitor C22. A first terminal of the first switch transistor T21 is connected to the field interface 105 and is also connected to a control terminal of the first switch transistor T21 via the first capacitor C22. A second terminal of the first switch transistor T21 is connected to the second terminal of the isolation module 104. The control terminal of the first switch transistor T21 is connected to the second terminal of the isolation module 104 via the first resistance R21 and is also connected to the second terminal of the first switch transistor T21 via the second resistance R22.

Illustratively, in the case where the field interface 105 is connected to a positioning valve, to control the specific parameters of the positioning valve, the control interface 101 is connected to a positioning valve monitoring apparatus on the control room side. The positioning valve monitoring apparatus is disposed between two interfaces of the control interface 101 and is connected to an adjustable power supply. For example, the adjustable power supply may be a direct current source. The adjustable power supply can input an opening control signal corresponding to the control parameter to the control interface 101. When the field interface 105 is connected to a positioning valve, the adjustable power supply module 102 in the HART circuit 100 outputs a first power signal. The current signal obtained by superimposing the first power signal and the opening control signal can be used as the positioning valve control signal. The positioning valve control signal is transmitted to the first terminal of the isolation module 104. The second terminal of the isolation module 104 is connected to the field interface 105. The positioning valve can adjust specific parameters according to the positioning valve control signal output by the field interface 105. Signal transmission in this process achieves control of the field positioning valve at the control room side. For example, the positioning valve monitoring apparatus can deliver a variable current signal to the control interface 101. The first power signal may be a voltage signal and can guarantee the transmission capability of the variable current signal. The variable current signal may be a 4-20 mA analog current signal, which is transmitted to the field interface 105 via the isolation module 104. The positioning valve connected to the field interface 105 can adjust specific parameters according to the 4-20 mA analog current signal. For example, the specific parameters may be parameters such as opening of the positioning valve, closing of the positioning valve, and/or opening amount of the positioning valve.

When it is necessary to monitor or set a positioning valve connected to the field interface 105, the manual operator is connected between the two interfaces 1+ and 1− of the control interface 101. The alternating current signal (namely, the second inquiry signal) generated at the control interface 101 directly enters the first terminal of the isolation module 104. After the coupling and isolation performed by the isolation module 104, the positioning valve connected to the field interface 105 receives the second inquiry signal. In response to the second inquiry signal, the positioning valve connected to the field interface 105 inputs a first reply signal to the second interface 2− of the field interface 105. For example, the first reply signal is an alternating current voltage signal. The first reply signal can form a partial voltage at the control terminal of the first switch transistor T21 via the first capacitor C22 and the second resistance R22. The alternating partial voltage signal causes the first switch transistor T21 to be turned on or turned off, thereby causing the coupling power supply to generate an alternating current signal. Finally, the isolation module 104 can couple the alternating signal to the first terminal of the isolation module 104 and output the alternating signal from the control interface 101. As a result, the diagnostic apparatus receives the HART signal returned from the positioning valve connected to the field interface 105. In this manner, based on the control of the positioning valve by the analog current signals, bidirectional HART communication between the control room and the positioning valve is achieved, and the communication timeliness between the control room and the field positioning valve is improved.

For example, based on the preceding embodiments, with continued reference to FIG. 3, the isolation module 104 includes an inverter unit 301, a transformer 302, and a rectifier unit 303. A first terminal of the inverter unit 301 is used as the first terminal of the isolation module 104. A second terminal of the inverter unit 301 is connected to a primary side T1 of the transformer 302. The inverter unit 301 is configured to convert a direct current signal connected to the first terminal of the inverter unit 301 into an alternating current signal and transmit the alternating current signal from the second terminal of the inverter unit 301 to the primary side T1 of the transformer 302. The transformer 302 is configured to implement isolation and coupling between the primary side T1 and a secondary side T2. A first terminal of the rectifier unit 303 is connected to the secondary side T2 of the transformer 302. A second terminal of the rectifier unit 303 is used as the second terminal of the isolation module 104. The rectifier unit 303 is configured to perform rectifying on an alternating current signal of the secondary side T2 of the transformer 302 and output a rectified electrical signal from the second terminal of the rectifier unit 303.

For example, the first terminal of the inverter unit 301 includes a connection terminal and a first ground terminal GND3. The connection terminal, as the first terminal of the isolation module 104, is connected to the control interface 101. The second terminal of the inverter unit 301 is connected to the primary side T1 of the transformer 302. The inverter unit 301 can convert a direct current signal connected to the first terminal into an alternating current signal and transmit the alternating current signal to the primary side T1 of the transformer 302, and then the alternating current signal returns to the inverter unit 301 via the coil of the primary side T1 and is grounded via the first ground terminal GND3, thereby forming a loop on the primary side T1 of the transformer 302. The transformer 302 can implement isolation and coupling of electrical signals between the primary side T1 and the secondary side T2. Illustratively, the transformation ratio of the primary side T1 of the transformer 302 to the secondary side T2 of the transformer 302 may be 1:1. The second terminal of the rectifier unit 303 is used as the second terminal of the isolation module 104. The rectifier unit 303 can rectify the alternating current signal of the secondary side T2 of the transformer 302 into a single-phase pulse signal and transmit the single-phase pulse signal to the second terminal of the rectifier unit 303. The frequency of the single-phase pulse signal is less than the frequency of the alternating current signal at the secondary side T2 of the transformer 302. Illustratively, the rectifier unit 303 includes a bridge rectifier circuit Q. Two input terminals of the bridge rectifier circuit Q are connected to two terminals of the secondary side T2 of the transformer 302, respectively, and two output terminals of the bridge rectifier circuit Q are connected to two interfaces of the field interface, respectively. In addition, the two output terminals of the bridge rectifier circuit Q can be used as a second power supply terminal VCC2 and a second ground terminal GND2 in a one-to-one manner. The power supply of the second power supply terminal VCC2 is obtained by coupling of the transformer 302. A first filter capacitor C23 and a second filter capacitor C21 can be connected in parallel between the second power supply terminal VCC2 and the second ground terminal GND2. The configuration of the inverter unit 301, the transformer 302, and the rectifier unit 303 implements isolation and coupling of signals between the field interface 105 side and the control interface 101 side, ensures stable transmission of electrical signals, and ensures safe operation of the equipment connected to the field interface 105.

For example, based on the preceding embodiments, with continued reference to FIG. 3, the first HART module 103 includes a second switch transistor T8. A control terminal of the second switch transistor T8 is connected to the control interface 101. A first terminal of the second switch transistor T8 is connected to the adjustable power supply module 102 and a first power supply terminal VCC3. A second terminal of the second switch transistor T8 is connected to a first ground terminal GND3. The adjustable power supply module 102 includes a comparison unit U1 and a power supply unit 304. The comparison unit U1 includes a first comparison terminal a, a second comparison terminal b, and a first output terminal c. The first comparison terminal a is connected to the second terminal of the second switch transistor T8. The first comparison terminal a is also connected to a set power supply terminal VAC via a resistance and a capacitor. The voltage level of the set power supply terminal VAC is not equal to the voltage level of the first power supply terminal VCC3. The second comparison terminal b is connected to the first power supply terminal VCC3. The comparison unit U1 is configured to output a corresponding second control signal according to the relative relationship between an electrical signal connected to the first comparison terminal a and an electrical signal connected to the second comparison terminal b. An output terminal of the power supply unit 304 is connected to the control interface 101. An input terminal of the power supply unit 304 is connected to the first power supply terminal VCC3. A control terminal of the power supply unit 304 is connected to the first output terminal c. The power supply unit 304 is configured to output the first power signal or the first HART signal according to the second control signal.

For example, a third resistance R18 and a second capacitor C15 are connected in series between the control terminal of the second switch transistor T8 and the first interface 1+ of the control interface 101. A fourth resistance is connected in series between the control terminal of the second switch transistor T8 and the second interface 1− of the control interface 101. When receiving the first inquiry signal inputted from the control interface 101, the first inquiry signal may be an alternating current voltage signal and can form an alternating partial voltage at the control terminal of the second switch transistor T8 so that controlling the second switch transistor T8 be turned on or off as the partial voltage fluctuates. When the second switch transistor T8 is turned on, a path is formed between the first power supply terminal VCC3 and the first ground terminal GND3. While when the second switch transistor T8 is turned off, the first power supply terminal VCC3 supplies power to the first comparison terminal a of the comparison unit U1 so as to achieve the grounding of the first comparison terminal a of the comparison unit U1 or accessing of the first comparison terminal a of the comparison unit U1 to the first power supply terminal VCC3. The comparison unit U1 can output a corresponding second control signal according to the relative relationship between an electrical signal connected to the first comparison terminal a and an electrical signal connected to the second comparison terminal b. The second control signal may be a digital signal, namely, "1" or "0". For example, if the voltage level connected to the first comparison terminal a and the voltage level connected to the second comparison terminal b are equal, the comparison unit U1 outputs "0". If the voltage level connected to the first comparison terminal a and the voltage level connected to the second comparison terminal b are not equal or the difference between the voltage level connected to the first comparison terminal a and the voltage level connected the second comparison terminal b exceeds a preset value, the comparison unit U1 outputs "1". The power supply unit 304 also includes a third switch transistor T6, a first diode D5, a power supply filter inductor L1, and at least one power supply filter capacitor. A first terminal of the third switch transistor T6 is used as the input terminal of the power supply unit 304. A second terminal of the third switch transistor T6 is used as the output terminal of the power supply unit 304. A control terminal of the third switch transistor T6 is used as the control terminal of the power supply unit 304. The first diode D5 is connected between the first ground terminal GND3 and the second terminal of the third switch transistor T6 to determine the output direction of the power supply. The power supply filter inductor L1 is connected to the second terminal of the third switch transistor T6, which has an effect on filtering the output power. The third switch transistor T6 can be turned on or off according to the second control signal. In the case where the first inquiry signal is not connected to the control interface 101, the second switch transistor T8 is continuously off, the third switch transistor T6 is continuously on, and the adjustable power supply module 102 outputs the first power signal. The first power signal is an electrical signal output from the first power terminal. In the case where the first inquiry signal is connected to the control interface 101, the second switch transistor T8 switches the on and off states according to the frequency of the first inquiry signal so that the corresponding third switch transistor T6 also switches the on and off states according to the second control signal. In this manner, the first power signal is modulated into the first HART signal output via the second terminal of the third switch transistor T6.

Illustratively, when the HART circuit 100 implements an analog current signal access function (namely, the control room collects the measurements from a transmitter), a load resistance is connected between the two interfaces 1+ and 1− of the control interface 101, and the two interfaces 2+ and 2− of the field interface 105 are connected to a field temperature or voltage transmitter (which may also be considered as a variable resistance whose resistance value is related to the measured value). The transmission direction of the analog current signal is from the field interface 105 to the control interface 101 via the isolation module 104. At this time, the second switch transistor T8 is turned off so that the comparison unit U1 outputs the high level to the control terminal of the third switch transistor T6 to ensure that the third switch transistor T6 is turned on. Then the adjustable power supply module 102 outputs the first power signal to the first interface 1+ of the control interface 101. The first power signal is the direct current voltage signal output from a first power terminal of the adjustable power supply module 102. The first power signal is connected to the first ground terminal GND3 connected to the inverter unit 301 via the load resistance, the inverter unit 301, and the primary side T1 of the transformer 302 in sequence to form a power supply loop. The secondary side T2 of the transformer 302 supplies power to the temperature or voltage transmitter connected to the field interface 105, and a loop is also formed at the secondary side T2 of the transformer 302. The measured value of the temperature or voltage transmitter affects the resistance value connected to the field interface 105 and changes 4-20 mA analog current signals flowing through the field interface 105, thereby changing electrical signals flowing through the secondary side T2 of the transformer 302. The electrical signals of the primary side T1 and the secondary side T2 of the transformer 302 are coupled to each other so that the measured value of the temperature or voltage transmitter can be obtained by detection of the 4-20 mA analog current signals flowing through the load resistance.

While the HART circuit 100 implements the analog current signal access function, if it is necessary to monitor or set a temperature or voltage transmitter connected to the field interface 105, an adjustable alternating current voltage source can be connected between the two interfaces 1+ and 1− of the control interface 101. The alternating current signal generated by the alternating current voltage source forms a partial voltage via the third resistance R18, the second capacitor C15, and the fourth resistance. The alternating partial voltage signal can cause the second switch transistor T8 to take effect. The on and off of the second switch transistor T8 affects the voltage level connected to the first comparison terminal a of the comparison unit U1. The comparison unit U1 compares the relative relationship between the first comparison terminal a and the second comparison terminal b to control the on and off of the third switch transistor T6. The adjustable power supply unit can then output the voltage signal (namely, the first HART signal) whose duty ratio is related to the alternating current voltage source, and the voltage signal is transmitted to the inverter unit 301 via the load resistance. The voltage signal is transmitted to the field interface 105 via the transformer 302 and the rectifier unit 303 so that the field temperature or voltage transmitter receives the first HART signal. In response, the temperature or voltage transmitter can reply to the first HART signal by inputting an alternating current signal to the field interface 105.

When the HART circuit 100 implements an analog current signal output function (namely, the control room controls the state of the field positioning valve), an adjustable direct current source is connected between the two interfaces 1+ and 1− of the control interface 101, and a positioning valve is connected between the two interfaces 2+ and 2− of the field interface 105. The transmission direction of the analog current signal is from the control interface 101 to the positioning valve connected to the field interface 105 via the isolation module 104. At this time, the second switch transistor T8 is turned off so that the comparison unit U1 outputs the high level to the control terminal of the third switch transistor T6 to ensure that the third switch transistor T6 is turned on. Then the adjustable power supply module 102 outputs the first power signal to the first interface 1+ of the control interface 101. The first power signal is a direct current voltage signal output from the first power terminal, which provides power for the adjustable direct current source. The current output from the direct current source is an analog current signal. The analog current signal, after being transmitted to the first terminal of the inverter unit 301, is regulated by the inverter unit 301 and returned to the first ground terminal GND3 connected to the inverter unit 301 via the primary side T1 of the transformer 302. In this manner, the analog current signal is coupled to the rectifier unit 303 connected to the secondary side T2 of the transformer 302 and flows into the positioning valve via the field interface 105 to complete the transmission.

While the HART circuit 100 implements the analog current signal output function, the control terminal is connected to the adjustable alternating current source if it is necessary to monitor or set a positioning valve on the field side. The alternating current signal generated by the alternating current source directly enters the isolation module 104 so that the positioning valve connected to the field interface 105 receives a second inquiry signal. The positioning valve inputs an alternating current voltage signal as a reply signal to the second interface of the field interface 105. The alternating current voltage signal forms a partial voltage at the control terminal of the first switch transistor T21 via the first capacitor C22 and the second resistance R22. The alternating partial voltage signal causes the on and off of the first switch transistor T21 so that the third power terminal generates an alternating current signal and finally transmits the alternating current signal to the primary side T1 of the transformer 302 via the rectifier bridge and the transformer 302. In this manner, the control interface 101 can receive the second HART signal replying to the second inquiry signal.

In the HART circuit provided by this embodiment, a comparison unit and a third switch transistor are provided in the adjustable power supply circuit, and a second switch transistor is provided in the first HART module. By the connection relationship between the switch transistor and the comparison unit, the function of modulating the power supply according to the first inquiry signal is achieved, and bidirectional HART communication between the control side and the transmitter connected to the field side is completed. A first switch transistor is provided in a second HART module, and a first switch transistor can be turned on or off according to the alternating current voltage signal input from the field interface so that the function of modulating the second HART signal according to the first reply signal is achieved, and bidirectional communication between the control side and the positioning valve connected to the field side is completed. In this manner, the HART circuit is suitable for various types of application scenarios, and applicability of the HART circuit is improved.

For example, based on the preceding embodiments, with continued reference to FIG. 3, the HART circuit 100 also includes an intrinsically safe energy-limiting unit 305 disposed between the second HART module 201 and the field interface 105. The intrinsically safe energy-limiting unit 305 is configured to limit a voltage or current level output to the field interface 105.

For example, since the HART circuit 100 is commonly used in the production and processing fields of petroleum, natural gas, or other hazardous chemicals, and the transmission of electric signals may easily cause an explosion of hazardous chemicals, intrinsically safe energy-limiting unit 305 can limit the voltage and the current level output from the field interface 105, thereby preventing explosion and improving the safety of the HART circuit 100.

For example, based on the preceding embodiments, with continued reference to FIG. 3, the HART circuit 100 also includes a first interface protection unit 306 and a second interface protection unit 307. The first interface protection unit 306 includes a first transient diode TVS2, a first filter inductor L2, a second filter inductor L3, and a first fuse F10. The first transient diode TVS2 is connected between two interfaces 1+ and 1− of the control interface 101. The first filter inductor L2 and the first fuse F10 are connected in series between the first interface 1+ of the control interface 101 and the adjustable power supply module 102. The second filter inductor L3 is connected between the second interface 1− of the control interface 101 and the first terminal of the isolation module 104. The second interface protection unit 307 includes a second transient diode TVS10, a third filter inductor L21, and a fourth filter inductor L22. The second transient diode TVS10 is connected between two interfaces 2+ and 2− of the field interface 105. The third filter inductor L21 is connected between a first interface 2+ of the field interface 105 and the second terminal of the isolation module 104. The fourth filter inductor L22 is connected between a second interface 2− of the field interface 105 and the second terminal of the isolation module 104.

For example, the first transient diode TVS2 and the second transient diode TVS10 can prevent damage to the HART circuit 100 by the surge signal in external electrical signals. The first fuse F10 can prevent circuit damage caused by overcurrent. The first filter inductor L2, the second filter inductor L3, the third filter inductor L21, and the fourth filter inductor L22 can filter out clutter in the communication electric signals, thereby improving the clarity of the HART communication signals. Additionally, a second fuse F11 is disposed between the primary side T1 of the transformer 302 and the inverter unit 301. A third fuse F20 is disposed between the intrinsically safe energy-limiting unit 305 and the rectifier unit 303 to prevent circuit damage caused by overcurrent of the circuit on the field side.

In the HART circuit provided by this embodiment, a transient diode, a filter inductor, and a fuse are connected to a control interface and a field interface, so as to prevent surge damage and overcurrent damage and filter out signal clutter. In this manner, the safety of the HART circuit is further improved, the service life of the HART circuit is prolonged, and the communication quality is improved.

Figure 4:
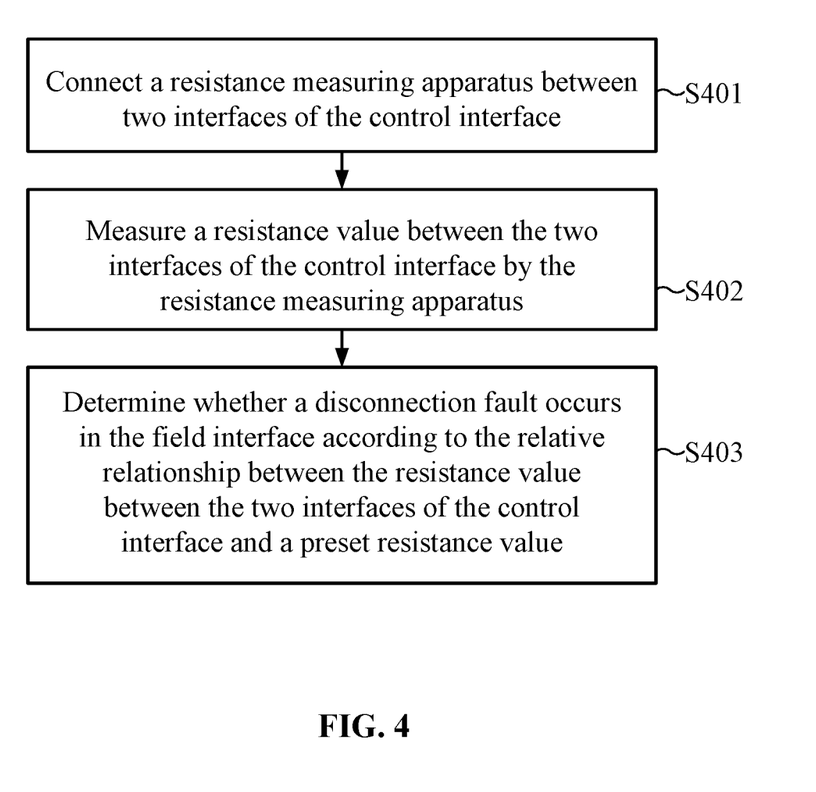
FIG. 4 is a schematic flowchart of a method for determining the state of a field interface of a HART circuit according to an embodiment of the present application.

The present application also provides a method for determining the state of a field interface of a HART circuit. The method is for determining whether a disconnection fault occurs at the field interface in any of the preceding embodiments. FIG. 4 is a schematic flowchart of a method for determining the state of a field interface of a HART circuit according to this embodiment of the present application. Referring to FIG. 4, the method for determining the state of the field interface of the HART circuit includes the steps described below.

S401: A resistance measuring apparatus is connected between the two interfaces of the control interface.

For example, a resistance measuring apparatus is connected between the two interfaces of the control interface. The resistance measuring apparatus can be integrated into a transmitter monitoring apparatus or a positioning valve monitoring apparatus. The resistance measuring apparatus can measure the resistance value between the two interfaces of the control interface in real time.

S402: a resistance value between the two interfaces of the control interface is measured by the resistance measuring apparatus.

For example, a resistance value between the two interfaces of the control interface is measured by the resistance measuring apparatus. The resistance value is not only related to the resistance, inductance, capacitance, and other apparatuses connected between the two interfaces of the control interface, but also to the resistance value of the loop formed on the secondary side of the transformer.

S403: Whether a disconnection fault occurs in the field interface is determined according to the relative relationship between the resistance value between the two interfaces of the control interface and a preset resistance value.

For example, the preset resistance value may be one value, or different preset values set according to different states of the HART circuit. When the wiring between the field interface and the transmitter or positioning valve is disconnected, that is, the two interfaces of the field interface are in a disconnected state, the secondary side of the transformer has no current, resulting in no current to the coil on the secondary side. In this case, the two interfaces of the control interface are in a high resistance state. At this time, the resistance between the two interfaces of the control interface is greater than the preset resistance value. When the current source cannot be input to the control interface, it can be learned that the wiring of the field interface is faulty.

Illustratively, in the case where the resistance between the two interfaces of the control interface is greater than or equal to the preset resistance value, it is determined that a disconnection fault occurs in the field interface. If the resistance between the two interfaces of the control interface is less than the preset resistance value, it is determined that the field interface is in a normal state.

In the HART circuit and a method for determining the state of the field interface thereof provided by this embodiment of the present application, the adjustable power supply module can provide variable power supply for the HART circuit to form a loop. The isolation module forms isolation and coupling between the control interface and the field interface, which can not only prevents the influence of the equipment connected to the control interface and the power supply on the safety of the field equipment, but also achieves the transmission of analog signals between the control interface and the field interface, thereby achieving the detection or control of the equipment connected to the field interface by the equipment connected to the control interface. The first HART module can generate the first control signal according to the first inquiry signal input by the control interface. The adjustable power supply module can modulate the first power signal into a first HART signal according to the first control signal. In the case where the equipment connected to the control interface detects the equipment connected to the field interface, the first HART module achieves HART communication between the control interface and the field interface. The HART signal is superimposed on the analog signal in the circuit, so that bidirectional communication between a control room and a production field and determination of the state of the interface on the basis of the transmission of the analog signal is achieved, and checks of interface state at the field is avoided. In this manner, the communication function of the HART circuit is more diversified, and the performance of the HART circuit and the work efficiency of the field are improved.

The invention claimed is:

1. A Highway Addressable Remote Transducer (HART) circuit, comprising:
 a control interface, an adjustable power supply module, a first HART module, an isolation module, and a field interface;
 wherein the first HART module is connected to the control interface, and the first HART module is configured to generate a first control signal when receiving a first inquiry signal inputted from the control interface;
 wherein the adjustable power supply module is connected to the control interface and the first HART module, and the adjustable power supply module is configured to output a first power signal to the control interface and, and in response to the first control signal, modulate the first power signal into a first HART signal;
 wherein a first terminal of the isolation module is connected to the control interface, and the isolation module is configured to isolate a signal from the first terminal of the isolation module to generate an isolated signal and couple the isolated signal to a second terminal of the isolation module; and wherein the field interface is connected to the second terminal of the isolation module.

2. The HART circuit of claim 1, further comprising a second HART module, and the second HART module is disposed between the field interface and the second terminal of the isolation module, wherein the second HART module is configured to modulate a first reply signal to a second HART signal and transmit the second HART signal to the second terminal of the isolation module when receiving the first reply signal from the field interface.

3. The HART circuit of claim 2, wherein the second HART module comprises a first switch transistor, a first resistance, a second resistance, and a first capacitor; wherein a first terminal of the first switch transistor is connected to the field interface and is connected to a control terminal of the first switch transistor via the first capacitor, a second terminal of the first switch transistor is connected to the second terminal of the isolation module, and the control terminal of the first switch transistor is connected to the second terminal of the isolation module via the first resistance and is connected to the second terminal of the first switch transistor via the second resistance.

4. The HART circuit of claim 2, wherein the isolation module comprises an inverter unit, a transformer, and a rectifier unit; wherein a first terminal of the inverter unit is used as the first terminal of the isolation module, a second terminal of the inverter unit is connected to a primary side of the transformer, and the inverter unit is configured to convert a direct current signal connected to the first terminal of the inverter unit into an alternating current signal and transmit the alternating current signal from the second terminal of the inverter unit to the primary side of the transformer;

wherein the transformer is configured to implement isolation and coupling between the primary side and a secondary side; and wherein a first terminal of the rectifier unit is connected to the secondary side of the transformer, and a second terminal of the rectifier unit is used as the second terminal of the isolation module, and the rectifier unit is configured to perform rectifying on an alternating current signal of the secondary side of the transformer and output a rectified electrical signal from the second terminal of the rectifier unit.

5. The HART circuit of claim 4, wherein the rectifier unit comprises a bridge rectifier circuit.

6. The HART circuit of claim 2, further comprising an intrinsically safe energy-limiting unit disposed between the second HART module and the field interface, wherein the intrinsically safe energy-limiting unit is configured to limit a voltage or current level output to the field interface.

7. The HART circuit of claim 1, wherein the first HART module comprises a second switch transistor; wherein a control terminal of the second switch transistor is connected to the control interface, a first terminal of the second switch transistor is connected to the adjustable power supply module and a first power supply terminal, and a second terminal of the second switch transistor is connected to a first ground terminal.

8. The HART circuit of claim 7, wherein the adjustable power supply module comprises a comparison unit and a power supply unit;

wherein the comparison unit comprises a first comparison terminal, a second comparison terminal, and a first output terminal; wherein the first comparison terminal is connected to the second terminal of the second switch transistor, the second comparison terminal is connected to the first power supply terminal, and the comparison unit is configured to output a second control signal according to a relative relationship between an electrical signal connected to the first comparison terminal and an electrical signal connected to the second comparison terminal; and wherein an output terminal of the power supply unit is connected to the control interface, an input terminal of the power supply unit is connected to the first power supply terminal, a control terminal of the power supply unit is connected to the first output terminal, and the power supply unit is configured to output the first power signal or the first HART signal according to the second control signal.

9. The HART circuit of claim 8, wherein the power supply unit further comprises a third switch transistor; wherein a first terminal of the third switch transistor is used as the input terminal of the power supply unit, a second terminal of the third switch transistor is used as the output terminal of the power supply unit, and a control terminal of the third switch transistor is used as the control terminal of the power supply unit.

10. The HART circuit of claim 1, further comprising a first interface protection unit and a second interface protection unit, wherein the first interface protection unit comprises a first transient diode, a first filter inductor, a second filter inductor, and a first fuse; wherein the first transient diode is connected between two interfaces of the control interface, the first filter inductor and the first fuse are connected in series between a first interface of the control interface and the adjustable power supply module, and the second filter inductor is connected between a second interface of the control interface and the first terminal of the isolation module; and wherein the second interface protection unit comprises a second transient diode, a third filter inductor, and a fourth filter inductor, wherein the second transient diode is connected between two interfaces of the field interface, the third filter inductor is connected between a first interface of the field interface and the second terminal of the isolation module, and a fourth filter inductor is connected between a second interface of the field interface and the second terminal of the isolation module.

11. A method for determining a state of the field interface of the HART circuit of claim 1, comprising:

connecting a resistance measuring apparatus between two interfaces of the control interface;

measuring a resistance value between the two interfaces of the control interface by the resistance measuring apparatus; and determining whether a disconnection fault occurs in the field interface according to a relative relationship between the resistance value between the two interfaces of the control interface and a preset resistance value.

12. The method of claim 11, wherein determining whether the disconnection fault occurs in the field interface according to the relative relationship between the resistance value between the two interfaces of the control interface and the preset resistance value, comprises:

in response to determining that the resistance value between two interfaces of the control interface is greater than or equal to the preset resistance value, determining that a disconnection fault occurs in the field interface; and in response to determining that the resistance value between the two interfaces of the control interface is less than the preset resistance value, determining that the field interface is in a normal state.

* * * * *